United States Patent [19]

Stoll

[11] 4,441,523

[45] Apr. 10, 1984

[54] SEQUENCING VALVE

[76] Inventor: Kurt Stoll, Lenzhalde 72, D-7300 Esslingen a.N., Fed. Rep. of Germany

[21] Appl. No.: 403,166

[22] Filed: Jul. 29, 1982

[30] Foreign Application Priority Data

Jul. 31, 1981 [DE] Fed. Rep. of Germany ....... 3130291

[51] Int. Cl.³ ............................................ F16K 11/02

[52] U.S. Cl. .......................... 137/624.18; 137/625.11; 137/624.13; 251/230

[58] Field of Search ........... 137/624.2, 624.18, 624.13, 137/624.15, 625.11; 251/230; 74/1.5

[56] References Cited

U.S. PATENT DOCUMENTS

| | | | |
|---|---|---|---|
| 2,788,408 | 4/1957 | Cheney | 137/625.11 X |
| 3,136,335 | 6/1964 | Beech | 251/230 X |
| 3,539,878 | 11/1970 | Bell | 137/624.18 |

*Primary Examiner*—Alan Cohan

*Attorney, Agent, or Firm*—Flynn, Thiel, Boutell & Tanis

[57] ABSTRACT

A sequencing valve for use in a pneumatic program controller has two output ports in rotors on a common driving shaft which may be moved intermittently for moving such output ports into line with circles of output ports in stators, in which the rotors are placed. The stator output ports are regularly spaced. The two rotor output ports or the groups of stator ports in the two stators are out of line with each other by half the pitch of the ports in the stators.

The intermittent driving motor has a rocking fork for turning a toothed wheel on the driving shaft. The fork is mechanically locked in its two half-step positions by way of a stop pin which is moved by a bellows actuator against the force of a spring so that a stop collar on the pin may be moved into and out of the way of the rocking fork.

9 Claims, 2 Drawing Figures

SEQUENCING VALVE

BACKGROUND OF THE INVENTION

The present invention is with respect to a sequencing valve for use in a pneumatic program controller having: a rotor with an output port; a stator with a number of output ports therein placed along the path of the output port of the rotor; and an intermittent driving motor for turning the rotor in steps by way of a toothed wheel, a rocking driving fork with driving points at different distances from the axis of rocking, and a pneumatic actuator for driving the fork.

A stepping or sequencing valve on these general lines is to be seen in German Offenlegungsschrift specification No. 2,515,277.

In such a sequencing valve there is, for a given radial size of the rotor, an upper limit to the number of output ports because the connections used with the ports and the ports themselves have to be of a certain size and may not, for general use, be made smaller than this size. For general use, such a sequencing valve may be designed with ten outlet ports so that ten loads may be controlled through power amplifiers cyclically in the desired sequence.

GENERAL OUTLINE OF THE INVENTION

One purpose of the present invention is that of making such a further development of a sequencing valve of the sort noted that, while keeping to a small radial size, it is possible for a greater number of program steps to be effected in each cycle.

For effecting this purpose, and further purposes, a sequencing valve is so designed that it has two such rotors and two such stators, the output port on one rotor being positioned to be lined up with one of the output ports of a stator when the output port of the other rotor is between two output stator ports, the intermittent motor for the driving fork being designed for locking the driving fork in two positions in each step thereof.

The sequencing or stepping valve of the present invention makes it possible for a number of program step which may be effected in one cycle to be made two times as great without there being any danger of output through two output ports, placed next to each other, in a stator. The intermittent driving motor for the rotor only has to be a little more complex, seeing that the toothed wheel and the driving fork are, by their very nature, worked in half steps, such half steps in all cases being undertaken two at a time in the case of known sequencing valves, one such half step only being "on the way" to a full step and not being profited from in any way.

Further useful developments of the invention will be seen in the claims.

In one such further development, the ends of half steps of the driving fork are fixed by a stop which may be moved into the way of the fork, this making possible, with a very simple mechanical system, an exact positioning of the fork in its one end position.

In a further useful development of the invention such a stop may be formed by a stop pin with parts of different diameter and which is able to be moved lengthways parallel to the axis of rocking of the driving fork, such a design making it possible for the sequencing valve to be made smaller in size.

Furthermore, the stop pin may have a spring pushing it into that position in which its part with the greater diameter is in the way of the driving fork so that, as a useful effect, the driving fork is kept in a given single position, even after the supply of compressed air for an actuator driving the stop pin has been cut off, with the outcome that no further, uncontrolled running of the program will be possible.

The spring may be placed in a cylinder which, at the same time, is used for guiding the stop pin, the useful effect here being that the driving fork will be mechanically locked when there is a breakdown in the power for an actuator acting on the driving fork.

It is furthermore possible for the two rotors and stators to be placed on the two sides of the toothed wheel, this giving the useful effect that the sequencing valve may be made small in size. Furthermore, the pneumatic connections with the loads may be produced more straightforwardly.

LIST OF FIGURES AND DETAILED ACCOUNT OF ONE WORKING EXAMPLE OF THE INVENTION

An account will now be given of one working example of the invention in more detail on the footing of the figures.

Figure 1:
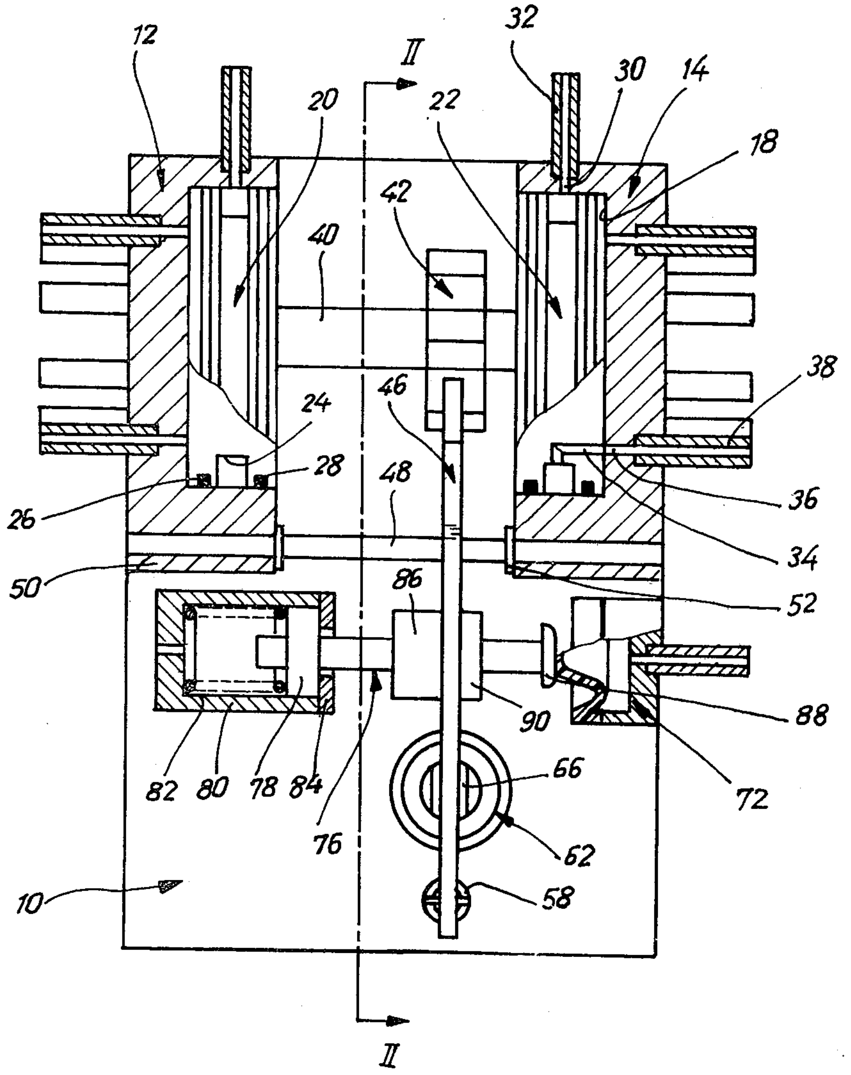
FIG. 1 is a view looking down onto program sequencing valve, which is sectioned through the rotor-stator units and through an actuator for a stop pin in different axial planes.
Figure 2:
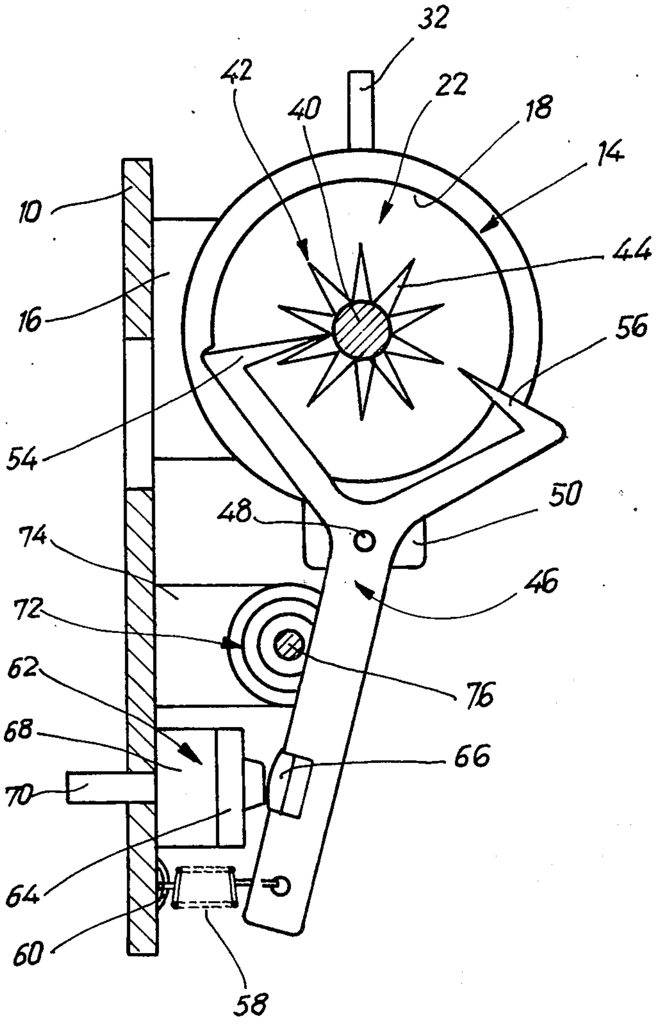
FIG. 2 is a section through the sequencing valve of figure 1 along the section line II—II therein, the stop pin, however, being seen in its moved-back, tooth-freeing position.

In the FIG. 1 the reader will see a programm sequencing valve, designed for the cyclic control of, at the most, twenty loads. On a base plate 10, two stator heads 12 and 14 will be seen to be fixed in position by way of support bases 16 (see FIG. 2) so that the stator heads are bilaterally symmetrical about a plane therebetween. Each of the stator heads 12 and 14 is generally cup-like and has a cylindrical space 18 therein, open towards the plane of symmetry and in which a rotor 20 and, in the other case, 22, is placed.

Each of the rotors 20, 22 has a circumferential groove 24 halfway between its radial faces. On the two sides of such groove 24, ring seals 26, 28 are seated in grooves to give a sealing effect between the given rotor and the inner face of space 18. It will be seen that an inlet port 30 is axially lined up with a circumferential groove 22 for opening thereinto. The port is furthermore joined up with one of two short input connection pipes 32 fixed in the head 12 or 14 as the case may be.

Furthermore, in the left hand radial face of rotor 20 and in the right hand radial face of rotor 22 it will be seen that there is an outlet port 34, the section, however, not being taken through such port 34 in the case of rotor 20. Each such port 34 is joined up by a right-angled duct with the circumferential groove 22 in the given rotor 20 or 22.

At an equal distance from the axis of space 18, stator heads 12 and 14 have ten axial ports 36, which are regularly spaced round the said axis and which are joined up with short output connection pipes 38 which are fixed in the stator heads. Such connection pipes 38 may be joined up with the control inputs of power amplifiers (not figured) for cyclically controlling the different loads. Furthermore, output signals at output connection pipes 38 are used for controlling different pneumatic logic elements such as AND or OR-gates as needed for the processing of feedback signals, for monitoring purposes and for controlling an intermittent or stepping drive for the rotors 20 and 22, of which a more detailed account is to be given herein.

In the present working example of the invention, the two stator heads 12 and 14 are quite the same in design so that they may be produced at a lower price and so that the short connection pipes 38 may be bilaterally symmetrical. Connection pipes 38 of stator heads 12 and 14 are, for this reason, lined up axially in twos, that is to say they are at the same angles about the axes of the spaces 18 in relation to the base plate 10. On the other hand, the rotors 20 and 22 are out of line with each other in the direction about their common driving shaft 40, by half the pitch of output ports 36. While the output port 34 of rotor 22 is, in the position of the parts to be seen in the figure, truly in line with the output port 36 of stator head 14, the output port of the other rotor 20 is halfway between two output ports in stator head 12 and is, for this reason, shut off, although this may not be seen in FIG. 1.

On driving shaft 40 there is a radially symmetrical driving toothed wheel 42 or spider with a number of driving teeth 44, answering to the number of output ports 36 of one or other of the stator heads, that is to say in the present case, ten such ports.

Driving wheel 42 is stepped by a driving fork generally numbered 46, which is keyed on a shaft 48 parallel to driving shaft 40. Shaft 48 is bearinged in bearing heads 50 as molded on stator heads 12 and 14 and is locked in position axially, in relation to the bearing heads 50, by circlips 52. Driving fork 46 has two pointed driving arms 54 and 56, which, with respect to the axis of shaft 48, are radially out of line. Putting it roughly, it may be said that driving arm 56 keeps to a curved line, whose radius is smaller than the radius of the curved line, along which driving arm 54 is moved, by a distance equal to half the width of a root of one of the teeth 44 as measured in the round-the-shaft direction. Because of this geometry, on rocking the rocking driving lever 46 in a counter-clockwise direction, driving arm 56 will be run up against the top side of a tooth 44 or arm and so have the effect of driving toothed wheel 42 in a clockwise direction through half a step, that is to say half the distance between teeth on the toothed wheel 42. On then rocking the rocking driving fork 46 in a clockwise direction, the driving arm 44 will be moved up against the lower side of a driving tooth 42 radially inwards so that the driving wheel 42 will be turned through a further half step or half tooth pitch.

The free end of rocking driving fork 46 is acted upon by a tension spring 58 whose other end is hooked into an eye 60 fixed to base plate 10. For rocking the driving fork 46 against the force of tension spring 58, there is a bellows actuator 62, with a driving bellows 64 designed for driving against a rounded rest plate 66 on the driving fork 46. The housing 68 of bellows actuator 62 is fixed to base plate 10, there being a short connection pipe 70 for the bellows actuator 62 running through the base plate 10.

A second bellows actuator 72 of the same design is fixed by way of a base 74 on base plate 10. It is designed for driving in a direction parallel to driving shaft 40 and is lined up with the axis of a stop pin 76.

Said stop pin 76 has a guiding left hand end 78 running in a guide bush 80 and acted upon by a coiled spring 82 to the right in FIG. 1. In this end position the piston-like end part 78 has its end face resting against the cover 84 of guide bush 80 and a stop collar 86, having a greater diameter, of the stop pin 76 is under the driving fork 46 for keeping it, against the force of tension spring 58, in that working position in which the driving arm 56 of the driving fork 46 is fully pushed in between two driving teeth 44, that is to say in a half step position.

The free end of stop pin 76 has a plate-like driving head 88 which is acted upon by a bellows actuator 72. In the first end position noted of stop pin 76, the end face 90, turned towards the second bellows motor 72, of the stop collar 86 is a distance in front of the driving fork 46 which is less than the motion of the bellows actuator 72 so that the stop collar 86 is moved into a position completely clear of the line of motion of driving fork 46 and the bellows actuator or motor 72 is supplied with air under pressure. For this reason, the driving fork 46 may be rocked into the second working position or half step to be seen in FIG. 2, in which the driving arm 54 is fully pushed in between one driving tooth 44 and the next one thereto.

It will be seen that, if the supply of compressed air for one or two of the bellows actuators 62 and 72 is cut off, the intermittent motor for the rotors 20 and 22 will be safely locked. For this reason, the angles of the rotors 20 and 22 will, in all cases, be at fixed steps and there is no uncontrolled or undesired supply of air under pressure to the loads.

I claim:

1. In a pneumatic sequencing valve for producing connections one at the time between an input port and any desired one of a group of output ports, having a rotor with an output port therein, a stator joined with said rotor and having a number of output ports therein, said stator's output ports being on a line traced out by said rotor's output port if said rotor is turned, an intermittent driving unit for turning said rotor in half steps equal to half the pitch of said stator output ports, a driving toothed wheel as part of said motor, a rocking driving fork for stepping said toothed wheel, said fork having an axis of rocking and fork arms placed at different radial distances from said rocking axis, and a pneumatic actuator for moving said rocking driving fork, the invention residing in that said sequencing valve has two such stators and two such rotors, said rotors being so ganged with their output ports at an angle about the axis of said rotors that when one rotor output port is lined up with one stator output port, the output port of said other rotor is between two stator output ports, said sequencing valve furthermore having parts for mechanically locking said driving fork of said intermittent driving unit in all half-step positions thereof.

2. The valve as claimed in claim 1 having a stop able to be moved in and out of the way of the driving fork for locking said fork in half-step positions.

3. The valve as claimed in claim 2 having a stop pin with a collar thereon forming said stop, said stop pin being able to be moved along its axis and parallel to a rocking axis of said driving fork.

4. The valve as claimed in claim 3, having a spring for loading said stop pin towards a position in which its stop collar is in the way of rocking motion of said driving fork.

5. The valve as claimed in claim 4 having a spring cylinder housing said spring and guiding said stop pin.

6. The valve as claimed in claim 3, having a spring acting on said driving fork for moving it towards said stop pin.

7. The valve as claimed in claim 6, having pneumatic bellows actuator for moving said stop pin against the force of the spring acting thereon.

8. The valve as claimed in claim 1, wherein the two rotors with their two stators are placed at the two sides of the toothed driving wheel.

9. The valve as claimed in claim 1, wherein said output ports of said rotors are lined with each other and said stator output ports are out of line with each other by an amount equal to half the pitch of said output ports in said stator.

* * * * *